Patented May 15, 1945

2,376,014

UNITED STATES PATENT OFFICE 2,376,014

POLYMERIZATION OF UNSATURATED ORGANIC COMPOUNDS

Waldo L. Semon and Charles F. Fryling, Silver Lake, Ohio, assignors to The B. F. Goodrich Company, New York, N. Y., a corporation of New York No Drawing. Application June 26, 1941, Serial No. 399,938

10 Claims. (Cl. 260—84.5)

This invention relates to the polymerization of unsaturated organic compounds which are capable of undergoing an addition polymerization to form high molecular weight linear polymers, particularly butadiene and mixtures of butadienes with other unsaturated compounds copolymerizable therewith. More specifically, this invention relates to new initiators of polymerization, and to the improved rubber-like or resinous products obtained when the polymerization is effected in presence of such new initiators.

It is well known that the conditions such as time and temperature which are necessary for linear polymerizations, and the quality and usefulness of the polymers produced are determined largely by the nature of the substances present along with the monomeric materials during the polymerization process. In practically all linear polymerizations, for example, whether carried out in a homogeneous system or in emulsion, the presence of an initiator of polymerization, that is, a substance which by some chemical action causes the polymerization to begin, is essential to completion of the process in a reasonably short time and at a reasonable low temperature. Oxygen-containing compounds such as hydrogen peroxide, benzoyl peroxide, and per-salts have heretofore been almost universally employed for this purpose. When such oxygen-containing initiators are used, however, these compounds may also function to oxidize the linear polymer as it is produced and thereby increase its degree of cross-linking or decrease its chain length, both of which are extremely undesirable because of their deleterious effect on the properties of the polymer. In the polymerization of butadienes or monomer mixtures containing a butadiene to rubber-like polymers or copolymers it is especially important that the product be substantially free of cross-linked structures since these render the polymers hard and unworkable. Accordingly, for many purposes, it is desirable to utilize compounds other than oxygen-containing compounds as initiators of polymerization. The principal object of this invention is to provide such new initiators.

In accordance with this invention, aliphatic diazo compounds are employed as initiators for the polymerization of unsaturated organic compounds which undergo addition polymerization to form high molecular weight linear polymers. These new initiators enable polymerization to be carried out in good yields in a relatively short time and at a low temperature, and also improve the properties of polymers formed in their presence over those prepared using the known initiators.

The aliphatic diazo compounds employed as initiators in this invention are compounds characterized by the presence of the diazo structure —N=N—, linked by two active valencies to a single aliphatic carbon atom, that is, a carbon atom which is not a part of a cyclic structure. These compounds may, accordingly, be represented by the structure

although it is believed that the structure would be more nearly correctly represented by making use of a covalent linkage as,

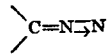

See Chem. Rev. 23, 193 (1938). The groupings satisfied by the two carbon valencies not linked to the diazo group may be varied to include a large number of aliphatic diazo compounds. Typical examples of compounds in this class are diazo substituted paraffin or olefin hydrocarbons such as diazo methane, diazo ethane, diazo propane, dimethyl diazo methane, diazo propylene, triphenyl methyl diazo methane, diethyl diazo methane and the like; diazo substituted aliphatic carboxylic acid derivatives such as diazo substituted salts of carboxylic acids, esters, amides, nitriles and the like among which are potassium or sodium diazo acetate or propionate, ethyl diazo acetate, ethyl alpha diazo propionate, ethyl diazo acetoacetate, diazo acetamide, diazo acetonitrile and the like; sulfonated derivatives of diazo substituted hydrocarbons such as diazo methane sulfonic acid or its salts, di-potassium diazo methane disulfonate and the like and other diazo substituted aliphatic compounds including aliphatic alcohols, ketones, aldehydes, alkyl halides and the like. The particular compounds preferred will depend largely upon the system undergoing polymerization and the method of polymerization being used as will be hereinafter explained.

As has been mentioned hereinabove, the initiators of this invention may be employed in the polymerization of unsaturated organic compounds which are capable of undergoing an addition polymerization to form a linear polymer. The principal types of unsaturated compounds which form linear polymers are the vinyl-type compounds and the butadienes but in general other unsaturated compounds containing the polymerizable structure

where at least one of the dangling valencies is connected to an electron attracting group, that is, a group which substantially increases the electrical disymmetry or polar character of the molecule, also possess this property. Two or more monomers which are capable of undergoing addition polymerization and which are capable of copolymerizing with one another in admixture may also be employed as the polymerizable material. Thus, the monomeric material may be a butadiene by which is meant butadiene-1,3 and its homologs and analogs which polymerize in essentially the same manner such as isoprene 2,3-dimethyl butadiene, piperylene, chloroprene and the like, by itself, or may be a mixture of butadienes, or a mixture containing one or more butadienes and one or more other unsaturated compounds which are copolymerizable therewith, among which are aryl olefins such as styrene, vinyl naphthalene and their chloro or alkoxy substituted derivatives; alpha methylene carboxylic acids and their esters, nitriles, amides and the like such as acrylic acid, methacrylic acid, methyl acrylate, methyl methacrylate, ethyl methacrylate, methyl ethacrylate, butyl acrylate, isobutyl methacrylate, acrylonitrile, methacrylonitrile, ethacrylonitrile, acryl amide, methacrylamide and the like, and other unsaturated polymerizable compounds such as vinylidene chloride, methyl vinyl ether, methyl vinyl ketone, vinyl ethinyl alkyl carbinols, vinyl acetylene, isobutylene, and other unsaturated hydrocarbons, esters, ketones, acids, alcohols, ethers and the like. The initiators of this invention are especially suitable for the polymerization of these monomeric materials containing a butadiene as one of the essential constituents and are even more suitable when the butadiene is the predominant constituent and a synthetic rubber-like material is obtained as the product, but they may also be used in the polymerization of monomeric materials not containing a butadiene but which do contain one or more of the unsaturated compounds mentioned above as being copolymerizable with butadienes such as styrene, etc., or other vinyl-type compounds such as vinyl chloride, vinyl acetate and the like.

In the practice of the invention the aliphatic diazo compound is added to the monomeric material and the monomeric material is then polymerized by any of the well known methods such as by polymerization in homogeneous systems or by polymerization in aqueous emulsion. In the emulsion polymerization process, which is at present preferred, the monomeric material is emulsified with water by the use of a suitable emulsifying agent such as a fatty acid soap or a synthetic saponaceous material, and polymerization is then effected by adding the initiator and agitating the emulsion at a temperature from about 20 to 50° C. until polymer is formed, this usually requiring from about 10 to 100 hours. When polymerization is effected in this manner it is desirable to employ an aliphatic diazo compound which is water soluble and may act in the aqueous phase of the emulsion. For this purpose diazo compounds containing groups which impart water solubility such as the alkali salts of diazo substituted aliphatic acids like sodium diazo acetate or the sulfonated diazo derivatives like dipotassium diazo methane disulfonate are especially suitable. If, on the other hand, polymerization is effected in a homogeneous system as by heating the monomeric material or a solution thereof, initiators which are easily soluble in the monomer or in the solvent employed such as diazo methane or diazo acetic esters are preferred. Care should be taken in handling highly reactive compounds like diazo methane since in addition to their great reactivity they may be toxic. Such compounds are best handled in solution.

The amount of the aliphatic diazo compound used in the polymerization process may be varied over a wide range and is not critical. For most purposes, however, amounts varying from 0.2 to 2% of the initiator based on the total weight of the monomeric material being polymerized are most effective. When the initiator is employed in this amount highest yields and best quality products are obtained.

As a specific example of one method of carrying out this invention a mixture of butadiene-1,3 and acrylonitrile is polymerized in aqueous emulsion the charge being made up as follows:

| | Parts |
|---|---|
| Butadiene-1,3 | 75 |
| Acrylonitrile | 25 |
| Emulsifying solution (3% aqueous solution of a fatty acid soap) | 250 |
| Potassium diazo acetate | 0.5 |

The emulsion is agitated at a temperature of 30° C. for 96 hours, at the end of this time the polymerization being complete. Coagulation of the latex-like dispersion resulting from the process yields a soft, plastic, tacky rubber-like copolymer. When hydrogen peroxide is employed as the initiator in the above example a rubber-like copolymer is obtained which is considerably less plastic and tacky and is more difficult to mill. The vulcanizates prepared from the copolymer made in accordance with this invention are also superior in tensile strength and ultimate elongation to those prepared from the product obtained with hydrogen peroxide as the initiator. If no initiator is employed in the above recipe, the polymerization requires over 150 hours and only a low yield of an inferior product results.

As another example of this invention 1.0 part of dipotassium diazomethane disulfonate is substituted for the potassium diazo acetate in the recipe of the first example. After 24 hours at 30° C., a copolymer is obtained in 97% yield which possesses good rubber-like properties and in addition is more plastic and tacky than copolymers similarly prepared using oxgen-containing initiators. If only 0.5 part of the dipotassium diazomethane disulfonate are employed, a longer time is required for the process but the tensile properties of the product are improved.

Similar results may be obtained by the use of other aliphatic diazo compounds and when polymerizing other monomeric materials. In addition it is to be understood that many other substances may be employed in the polymerization recipe without altering the effect of the initiators herein disclosed. Thus, modifiers of polymerization, accelerators of polymerization, catalysts of polymerization and other initiators of polymerization as well as substances which exert some other effect on the course of the polymerization or the properties of the product such as softeners or stabilizers for the product, may be added together with the monomeric materials and the initiators of polymerization of this invention either before, during or after the polymerization, if desired, the effect being that each substance added functions in its own way to improve the process or the products. It is also to be understood that the method and conditions of polymerization may be varied. Accordingly, the invention is not intended to be limited except by the spirit and scope of the appended claims.

We claim:

1. In a process of polymerizing a monomeric mixture containing a conjugated butadiene and an unsaturated organic compound copolymerizable therewith, the step which comprises adding an aliphatic diazo compound containing the diazo grouping —N=N— linked by two valencies to a single carbon atom, to the monomeric material before polymerization.

2. In a process of polymerizing a monomeric mixture containing a conjugated butadiene and an aryl olefin, the step which comprises adding an aliphatic diazo compound containing the diazo grouping —N=N— linked by two valencies to a single carbon atom, to the monomeric material before polymerization.

3. In a process of polymerizing a monomeric mixture containing a conjugated butadiene and an alpha methylene carboxylic acid nitrile, the step which comprises adding an aliphatic diazo compound containing the diazo grouping —N=N— linked by two valencies to a single carbon atom, to the monomeric material before polymerization.

4. In a process of polymerizing a monomeric mixture containing a conjugated butadiene and an alpha methylene carboxylic acid ester, the step which comprises adding an aliphatic diazo compound containing the diazo grouping —N=N— linked by two valencies to a single carbon atom, to the monomeric material before polymerization.

5. In a process of polymerizing a conjugated monomeric mixture containing a butadiene and an unsaturated organic compound which contains a

group and is copolymerizable therewith, the step which comprises adding a diazo substituted alkali metal salt of an aliphatic carboxylic acid to the monomeric material before polymerization.

6. In a process of polymerizing a conjugated monomeric mixture containing a butadiene and an unsaturated organic compound which contains a

group and which is copolymerizable therewith, the step which comprises adding a sulfonated diazo substituted aliphatic hydrocarbon to the monomeric material before polymerization.

7. In a process of polymerizing a monomeric mixture containing butadiene-1,3 and styrene, the step which comprises adding potassium diazo acetate to the monomeric material before polymerization.

8. In a process of polymerizing a monomeric mixture containing butadiene-1,3 and acrylonitrile, the step which comprises adding dipotassium diazomethane disulfonate to the monomeric material before polymerization.

9. In a process of polymerizing a monomeric mixture containing butadiene-1,3 and methyl methacrylate, the step which comprises adding dipotassium diazomethane disulfonate to the monomeric material before polymerization.

10. In a process of polymerizing a monomeric unsaturated organic compound which undergoes an addition polymerization to form a high molecular weight linear polymer and which contains the structure

wherein at least one of the disconnected valencies is attached to an electron attracting group, the step which comprises adding an aliphatic diazo compound containing the diazo grouping —N=N— linked by two valencies to a single carbon atom, to the monomeric unsaturated compound before polymerization.

WALDO L. SEMON.
CHARLES F. FRYLING.